United States Patent [19]

Tanuma

[11] Patent Number: 5,173,799
[45] Date of Patent: Dec. 22, 1992

[54] WAVELENGTH CONVERSION DEVICE

[75] Inventor: Ryohei Tanuma, Kanagawa, Japan

[73] Assignee: Fuji Electric Co., Ltd., Japan

[21] Appl. No.: 420,534

[22] Filed: Oct. 12, 1989

[30] Foreign Application Priority Data

Oct. 12, 1988 [JP] Japan .................. 63-256595

[51] Int. Cl.$^5$ .................. H03F 7/00; G02F 1/35; H01S 3/10
[52] U.S. Cl. .................. 359/326; 359/328; 359/330; 359/332; 372/21; 372/22; 385/112
[58] Field of Search .................. 350/432, 96.15; 307/424, 425, 426, 427, 428, 429, 430; 372/21, 22, 27; 359/240, 255, 326, 328, 329, 330, 332, 709, 483, 485; 385/122

[56] References Cited

U.S. PATENT DOCUMENTS

| | | | |
|---|---|---|---|
| 3,283,262 | 11/1966 | Marcatili | 372/19 |
| 3,590,266 | 6/1971 | Johnston, Jr. | 307/428 |
| 3,632,187 | 1/1972 | Habegger | 350/401 |
| 3,663,090 | 5/1972 | Miller | 350/401 |
| 3,949,323 | 4/1976 | Bierlein et al. | 359/326 |
| 3,993,915 | 11/1976 | Davydov et al. | 307/427 |
| 4,623,776 | 11/1986 | Buchroeder et al. | 350/172 |
| 4,630,274 | 12/1986 | Schafer | 372/9 |
| 4,755,027 | 7/1988 | Schafer | 350/394 |
| 4,822,151 | 4/1989 | Tatsuno et al. | 350/401 |
| 4,826,283 | 5/1989 | Chuangtian et al. | 385/122 |

FOREIGN PATENT DOCUMENTS 0106336 4/1984 European Pat. Off. ............ 350/612

OTHER PUBLICATIONS

Kolmeder, et al. "Scond Harmonic Beam Analysis, A Sensitive Technique to Determine the Duration of Single Ultrashort Laser Pulses" Optics Communications; vol. 30, No. 3, Sep. 1979, pp. 453–457.

"High-Efficiency High-Power Second-Harmonic Generation at 5321 A in Meta-Nitraniline" by K. Kato, pp. 1288–1290 IEEE Journal of Quantum Electronics, vol. QE-16, No. 12, Dec. 1980.

"Noncollinearly Phase Matched Second Harmonic Generation in LiIO" by S. Umegaki et al., Japanese Journal of Applied Physics, vol. 16, No. 5, May 1977, pp. 775–781.

Primary Examiner—Bruce Y. Arnold
Assistant Examiner—R. D. Shafer
Attorney, Agent, or Firm—Brumbaugh, Graves, Donohue & Raymond

[57] ABSTRACT

A change in the wavelength of a laser beam is achieved by causing the beam to have a conical wavefront and applying it to a nonlinear crystal so that the beam converges along the center axis producing an output beam of a different wavelength. The conical wavefront is achieved by use of lenses, mirrors and crystals with conical surfaces.

25 Claims, 7 Drawing Sheets

WAVELENGTH CONVERSION DEVICE

BACKGROUND OF THE INVENTION

The present invention relates to a wavelength conversion device in which a laser beam is applied on a nonlinear optical medium so as to obtain a beam of a different wavelength.

In the prior art, the laser generates a coherent beam of sharp directivity and is widely applied in various fields such as material processing and measurement fields. Recently, it has also been applied in medical and chemical industry fields. However, with the exception of some types, the laser vibrates or oscillates only at a specific wavelength which results in one of the most serious obstacles to its applications.

In order to solve this problem, wavelength conversion technology using various kinds of nonlinear optical materials is being used. Generally, when a beam is applied on a transparent crystal, dipoles are excited by polarization due to a vibrating electric field and the vibrating dipoles generate a new beam. The relationship between the polarization P and the electric field E is expressed by:

$$P = P_L + P_{NL}$$

$$P_L = \chi^{(1)} \cdot E$$

$$P_{NL} = \chi^{(2)} : E \cdot E + \chi^{(3)} \vdots E \cdot E \cdot E + \cdots \quad (1)$$

wherein $P_L$ is a linear polarization, $P_{NL}$ is a nonlinear polarization and $\chi^{(1)}$, $\chi^{(2)}$, $\chi^{(3)}$ are primary, secondary and tertiary polarizations, respectively. Generally, a high order polarization is smaller than $\chi^{(1)}$ and therefore, the higher order terms in the equation (1) may be disregarded in the case of a normal beam. However, when the laser beam is powerful and has a large E-value, a higher order polarization is present. Especially, as the secondary term is larger than the tertiary term and downward, we will express $P_{NL}$ in the following equation by secondary terms only. Accordingly, when $$P_{NL} = (P_x, P_y, P_z)^T,$$

$$E = (E_x, E_y, E_z)^T,$$

$$P_{NL} = \begin{vmatrix} P_x \\ P_y \\ P_z \end{vmatrix} = \begin{vmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{vmatrix} \begin{vmatrix} E_x^2 \\ E_y^2 \\ E_z^2 \\ 2E_yE_z \\ 2E_xE_z \\ 2E_xE_y \end{vmatrix} \quad (2)$$

will follow and in this equation, the x, y and z axes are taken in the direction of axis of the crystal and the z-axis is taken in the direction of the optical axis.

Now, assuming that there are two electric fields $E_1$ and $E_2$ having angular frequencies $\omega_1$, $\omega_2$ present in a crystal, and in that case, if $$E = E_1 + E_2$$

$$E_1 = E_{10} \cos(\omega_1 t - k_1 \cdot r + \theta_1) \quad (3)$$

$$E_2 = E_{20} \cos(\omega_2 t - k_2 \cdot r + \theta_2)$$

then the following equation will follow:

$$\begin{aligned} E \cdot E &= (E_1 + E_2) \cdot (E_1 + E_2) \\ &= E_{10}^2 \cos(\omega_2 t - k_2 \cdot r + \phi_1) + E_{20}^2 \cos(\omega_2 t - k_2 \cdot r + \phi_2) + 2E_{10} \cdot E_{20} \cos(\omega_1 t - k_1 \cdot r + \phi_1) \cos(\omega_2 t - k_2 \cdot r + \phi_2) \end{aligned} \quad (4)$$

wherein r is a position vector, $k_1$, $k_2$ are wave number vectors and $\theta_1$, $\theta_2$ are phase angles. These terms can be rewritten as follows:

$$\cos^2(\omega_i t - k_i \cdot r + \theta_i) = \tfrac{1}{2}\{1 + \cos(2\omega_i t - 2k_i \cdot r + 2\theta_i)\}(i=1,2) \quad (5)$$

$$\cos(\omega_1 t - k_1 \cdot r + \phi_1)\cos(\omega_2 t - k_2 \cdot r + \phi_2) = \quad (6)$$

$$\tfrac{1}{2}(\cos\{(\omega_1 - \omega_2)t - (k_1 - k_2) \cdot r + \phi_1 - \phi_2\} + \cos\{(\omega_1 + \omega_2)t - (k_1 + k_2)r + \phi_1 + \phi_2\})$$

As a result, $P_{NL}$ may be divided into frequency components $$0, 2\omega_1, \omega_1 - \omega_2, \omega_1 + \omega_2, 2\omega_2.$$

Of these components, the zero frequency component, that is, a DC component, means the rectification of an optical frequency electromagnetic wave in the nonlinear medium. Further, the $2\omega_2$ and $2\omega_2$ components are polarizations for causing second harmonic generation, $\omega_1 - \omega_2$ are those for causing differential frequency generation, $\omega_1 + \omega_2$ are those for causing sum frequency generation, respectively. However, it does not always follow that beams generate from all of these polarization waves of different frequencies; the kinds of frequency beams generated from the polarization waves depend on the phase matching conditions to be described below. Further, not only the incident beam, but also the interaction between it and the beam actually generated must be taken into consideration.

Assuming that a third beam of angular frequency $\omega_3$ generates from the above two beams and the electric field thereof is $E_3$, the entire electric field will be:

$$E = E_1 + E_2 + E_3 \quad (7)$$

and accordingly, the secondary nonlinear polarization will include a total of 9 frequency components as expressed by the following equation:

$$P_{NL} = \chi^{(2)} : E \cdot E = P^{(2\omega_1)} + P^{(2\omega_2)} + P^{(2\omega_3)} + P^{(\omega_1 - \omega_2)} + P^{(\omega_3 - \omega_2)} + P^{(\omega_3 - \omega_1)} + P^{(\omega_1 + \omega_2)} + P^{(\omega_3 + \omega_2)} + P^{(\omega_3 + \omega_1)} \quad (8)$$

Where the generated beam is of a sum frequency $\omega_3 = \omega_1 + \omega_2$, $$P^{(\omega_3 - \omega_2)} = P^{(\omega_1)} = P^{(\omega_1)}, \; P^{(\omega_3 - \omega_1)} = P^{(\omega_2)},$$
$$P^{(\omega_1 + \omega_2)} = P^{(\omega_3)}$$

will follow so that the term $E_1$ is derived from the terms $E_3$ and $E_2$, the term $E_2$ from the terms $E_3$ and $E_1$ and the term $E_3$ from the terms $E_1$ and $E_2$. That is, the three modes of $\omega_1$, $\omega_2$, $\omega_3$ are combined.

the relationship between the polarization $P_{NL}$ and the electrostatic field E is expressed by the Maxwell equation. That is $$\Delta E - \frac{1}{(c/\eta)^2} \frac{\partial^2 E}{\partial t^2} = \mu \frac{\partial^2 P_{NL}}{\partial t^2} \quad (9)$$

wherein $$\Delta = \frac{\partial^2}{\partial x^2} + \frac{\partial^2}{\partial y^2} + \frac{\partial^2}{\partial z^2}$$

as further, c is the velocity of beam in a vacuum, $\eta$ is the refractive index of the medium and $\mu$ is the magnetic permeability of the medium. In this case, the field vectors of the three beams are expressed by the following equation on the assumption that they progress in the z-direction.

$$E_i = e_i p_i \cos(\omega_i t - k_i z + \theta_i) \quad (i=1,2,3) \quad (10)$$

wherein $e_i$ is a unit vector and $\rho_i$ is a variable representing an amplitude. When the equations (7), (8) and (10) are substituted into the equation (9) and when it is assumed that $$d^2\rho_i/dz^2 << k_i \cdot d\rho_i/dz,$$

then the following equation will result.

$$\frac{d\rho_1}{dz} = -\frac{\omega_1^2 K}{k_1} \rho_2 \rho_3 \sin\theta \quad (11)$$

$$\frac{d\rho_2}{dz} = -\frac{\omega_2^2 K}{k_2} \rho_3 \rho_1 \sin\theta$$

$$\frac{d\rho_3}{dz} = -\frac{\omega_3^2 K}{k_3} \rho_1 \rho_3 \sin\theta$$

$$\frac{d\theta}{dz} =$$

$$\Delta k + K\left(\frac{\omega_3^2}{k_3} \frac{\rho_1 \rho_2}{\rho_3} - \frac{\omega_2^2}{k_2} \frac{\rho_3 \rho_1}{\rho_2} - \frac{\omega_1^2}{k_1} \frac{\rho_2 \rho_3}{\rho_1}\right)\cos\theta$$

wherein $K = \chi^{(2)}\mu_0/2$, $\Delta K = k_3 - k_1 - k_2$, $\theta = \Delta k z - \theta_3 + \theta_2 + \theta_1$ provided that $\chi^{(2)}$ which is an element of a matrix $\chi^{(2)}$ differs depending on how the plane of polarization for the incident beam is oriented. Further, $\mu_0$ is the magnetic permeability in a vacuum. By solving this differential equation, it is possible to obtain variations of the amplitudes $\rho_1$, $\rho_2$ and $\rho_3$ of the three frequency components.

Now let us consider the Second Harmonics Generation (SHG) as a particular case. This case corresponds to the equation (11) provided that $\omega_1 = \omega_2 = \omega$, $\omega_3 = \omega_1 + \omega_2 = 2\omega$, and $\rho_\omega = \rho_1 = \rho_2$,
$\rho_{2\omega} = \rho_3$ and the following equation is derived therefrom.

$$\frac{d\rho_\omega}{dz} = -\frac{2\omega^2 K}{k_{107}} \rho_\omega \rho_{2\omega} \sin\theta \quad (12)$$

$$\frac{d\rho_{2\omega}}{dz} = -\frac{4\omega^2 K}{k_{2\omega}} \rho_\omega^2 \sin\theta$$

$$\frac{d\theta}{dz} = \Delta k + 2\omega^2 K \left(\frac{2}{k_{2\omega}} \frac{\rho_\omega^2}{\rho_{2\omega}} - \frac{1}{k_\omega} \rho_{2\omega}\right)\cos$$

$\theta = \Delta k z = \phi_{2\omega} + 2\phi_\omega$ $\Delta k = k_{2\omega} - 2k_\omega$ To obtain the variation of $\rho_{2\omega}$ by solving the above equation, the result shown in FIG. 7 will be obtained. In this case, $\Delta S = \Delta k l_0$ and the $l_0$ designates the length required for about 75% of the fundamental wave output to be converted to a double high harmonic wave when $\Delta k=0$. From this result, it will be understood that when $\Delta k=0$, $\rho_{2\omega}$ increases uniformly together with z but when $\Delta k \neq 0$, $\rho_{2\omega}$ vibrates and the wavelength conversion is not effectively performed. From a qualitative point of view, this means that when $\Delta k=0$, the second high harmonic wave is effectively amplified because the polarization wave and second high harmonic wave generating therefrom go side by side in the same phase but when $\Delta k \neq 0$, a phase mismatch takes place because the velocity of polarization wave differs from that of the second high harmonic wave.

Now, the conditions for satisfying $\Delta k=0$ will be described below.

$k_\omega$ and $k_{2\omega}$ are expressed by:

$$k_\omega = \frac{2\pi}{\lambda_\omega} = \frac{\omega}{c/\eta_\omega} \quad (13)$$

$$k_{2\omega} = \frac{2\pi}{\lambda_{2\omega}} = \frac{2\omega}{c/\eta_{2\omega}} \quad (14)$$

wherein $\lambda_\omega$, $\lambda_{2\omega}$ and $\eta_\omega$, $\eta_{2\omega}$ are the lengths and refractive indices of the fundamental wave and second high harmonic waves, respectively. Therefore, to satisfy $\Delta k=0$, $\eta_\omega = \eta_{2\omega}$ must be satisfied. However, as will be understood from the fact that a white beam is separated by a prism, the refractive index differs depending on the wavelength and generally, the relationship of $\eta_{2\omega} > \eta_\omega$ is established. That is, $\Delta k \neq 0$ is usual.

To solve this problem, various kinds of phase matching means have been proposed. The first of them is the use of a nonlinear optical crystal having an optical anisotropy. In such crystal, the incident beam is divided into normal and abnormal beams and the refractive index of the former is constant irrespective of the direction of incidence while that of the latter changes depending on the direction of incidence. However, there is a direction in which the refractive indices of both of the beams coincide with each other and this direction is called an optical axis. Further, where the crystal has a single optical axis, it is called a uniaxial crystal and where two, it is called a biaxial crystal. Here, we consider only the uniaxial crystal. Note that the two beams displace from each other except in the direction of the optical axis and a direction normal thereto. For example, where the angle of incidence is 0° (the angle between the surface of the crystal and the incident beam is 90°), the normal beam progresses linearly but the abnormal beam refracts as shown in FIG. 8. In summation, it is in the optical axis direction that the refractive indices of the normal and abnormal beams are equal and in the direction normal to the optical axis that the progressing directions of the normal and abnormal beams are equal.

FIG. 9 shows a relationship between the directions of a beam and $\eta$ wherein $\eta^o_\omega$ and $\eta^e_\omega$ are the refractive indices of fundamental wave normal and abnormal beams, and $\eta^o_{2\omega}$ and $\eta^e_{2\omega}$ are those of second high harmonic wave normal and abnormal beams, respectively. From this figure, it will be understood that at an angle of $\theta_m$ with respect to the optical axis (z axis) $\eta^o_\omega(\theta_m)$ and $\eta^e_{2\omega}(\theta_m)$ coincide with each other. That is, phase matching is satisfied between fundamental wave as normal beam and second high harmonic wave generated as abnormal beam when the fundamental wave as normal beam is applied at angle $\theta_m$. To make the fundamental wave a normal beam, it may be applied as a linear polarization in a direction normal to the z axis whereby a high harmonic wave is emitted as a linear polarization parallel to the z axis. A case in which the fundamental wave is a normal beam and the high harmonic wave is an abnormal beam is generally called a Type I phase matching. On the other hand, it is possible for the fundamental wave to be a combination of a normal beam and an abnormal beam and such case is called a Type II phase matching. For the sake of simplicity of explanation, we will consider only the Type I phase matching.

The above phase matching (i.e., the Type I) is convenient because it is performed by mere adjustment of the incidence angle. However, as shown in FIG. 8, since the fundamental wave and the second high harmonic wave progress in different directions, the region of interaction of both the waves is limited to the hatched portion in the figure. However, if $\theta_m$ could be 90°, the progressing directions of both normal and abnormal beams will coincide so that a high efficiency wavelength conversion can be made but it is general that $\eta^o_\omega \neq \eta^e_{2\omega}(90°)$. However, there is a case in which both of the directions coincide when the temperature of the crystal is changed. This is because the temperature dependability differs between the refractive indices $\theta^o_\omega$ and $\eta^e_{2\omega}$. For example, when the output of the YAG laser (of wavelength of 1.06 $\mu$m) is a fundamental wave, it is possible to obtain a phase matching of 90° by controlling the temperature to 165° C. for lithium niobate (LiNbO$_3$) and 181° C. for potassium niobate (KNbO$_3$). Of course such temperatures differ depending on the wavelength of the laser output so that for example, it is possible to obtain the 90° phase matching at 25° C. with respect to a wavelength of 0.86 $\mu$m by using KNbO$_3$.

As other approaches for performing phase matching, there is one that uses a wave guide and one that applies fundamental waves from different directions. The former is represented by an optical fiber and a thin film wave guide and makes use of the phenomenon that the effective refractive index changes when the diameter or thickness of the wave guide is changed. That is, the mode of the beam propagating through the wave guide is dispersive and the dependability of the refractive indices of the beam with respect to the width of the wave guide differs. Therefore, phase matching is performed by allotting the fundamental and high harmonic waves to different modes and by adjusting the thickness of the wave guide. On the other hand, the latter approach takes into account phase matching as a vector volume. Heretofore, it has been considered that the fundamental and high harmonic waves progress in the same direction. However, as shown in FIG. 10, when two fundamental waves are applied from different directions with wave number vectors $K_{107}{}^1$ and $k_\omega{}^2$, the induced nonlinear polarization wave propagates with a wave number vector of $k_\omega{}^1 + k_\omega{}^2$. The condition for phase matching between the nonlinear polarization wave and the resultant second high harmonic wave of a wave number vector $k_{2\omega}$ which propagates in the same direction as the former is expressed by the following equation when $|k_\omega{}^1| = \uparrow k_\omega{}^2|$:

$$\eta_\omega \cos \alpha = \eta_{2\omega} \qquad (15)$$

Accordingly, in the case of a bulk crystal, phase matching is performed by adjusting o when the fundamental waves are normal beams and the second high harmonic wave is an abnormal beam. Further, it is also possible to perform a phase matching by using a wave guide such that the fundamental and high harmonic waves are allotted to different modes and $\alpha$ is adjusted instead of the width of the wave guide.

Of the above-mentioned conventional phase matching approaches, the one in which the incidence angle to the nonlinear optical crystal is adjusted is convenient but it has been accompanied with the problem that the interaction of the fundamental wave and high harmonic wave cannot be maintained long due to double refraction. On the other hand, the approach in which the temperature of the crystal is adjusted by applying the beam in the direction normal to the optical axis makes it possible to perform a high efficiency wavelength conversion, since the directions of the fundamental wave and high harmonic wave coincide with each other, but since the range in which the refractive index varies by changing the crystal temperature is quite small, the refractive index value must originally be suitable for the range so that the means is applicable to only a few kinds of crystals. Further, the wavelength range for effecting 90° phase matching is naturally limited.

Likewise, the approach of adjusting the width of the wave guide is hopeful but it still has many difficulties in actual practice because the wave guide width must be controlled to a high degree of accuracy.

Further, the approach of applying two fundamental waves from two different directions has had the problem that when the fundamental waves are so converged as to increase their energy density, the region where they overlap becomes small resulting in decreasing the efficiency.

An object of the present invention is to eliminate the above-mentioned problems and to provide a high efficiency wavelength conversion device which is applicable to a variety of nonlinear optical materials and to beams in a wide range of wavelengths.

SUMMARY OF THE INVENTION

In order to achieve the above objectives, the wavelength conversion device according to the present invention is an improvement over prior art devices of the type provided with beam generating and projecting means and a nonlinear optical medium and operating such that a beam from the beam generating and projecting means is applied on the nonlinear optical medium so that an outgoing beam having a wavelength different from that of the incident beam is derived from the nonlinear optical medium. In one embodiment the improvement in accordance with the invention is achieved by providing wave front conversion means between the beam generating and projecting means and the nonlinear optical medium such that the wave front of the beam from the beam generating and projecting means is made substantially conical and converged as applied to the nonlinear optical medium and further, the beam generating and projecting means is so constructed that the beam therefrom is applied to the wave front conversion means in a collimated form. In this case, the wave front conversion means may be a conical lens having the top of the conical portion directed opposite to the beam generating and projecting means.

In another embodiment, the nonlinear optical medium may be formed such that the surface facing the beam generating and projecting means is made substantially conical so that the wave front of the beam from the beam generating and projecting means is converted to become conical and converged into the nonlinear optical medium and the beam generating and projecting means is so constructed that the beam therefrom is applied on the nonlinear optical medium in collimated form.

In still another embodiment, the nonlinear optical medium may be formed so that the surface thereof facing opposite the beam generating and projecting means is made substantially conical in configuration with the top of conical portion extending outward, so that the wave front of the beam from the beam generating and projecting means is reflected to become conical and converged into the nonlinear optical medium. The beam generating and projecting means may be so constructed that the beam therefrom is applied on the nonlinear optical medium in collimated form and a plane parallel plate may be interposed between the beam generating and projecting means and the nonlinear optical medium so that of the beam components reflected on the plane parallel plate, the high harmonic wave is directed normal to the beam from the beam generating and projecting means.

In addition, in a further embodiment, a substantially conical mirror may be provided at a position opposite the beam generating and projecting means with the conical concave top portion directed opposite to the means so that the beam from the beam generating and projecting means is reflected thereon with its front face becoming conical and converged into the nonlinear optical medium. The beam generating and projecting means may be constructed as described above and the plane parallel plate is interposed between the beam generating and projecting means in the manner as already described.

In any of the above-mentioned embodiments, it is generally preferable that the nonlinear optical medium, conical lens and conical mirror be enclosed within a temperature adjusting vessel.

Figure 11:
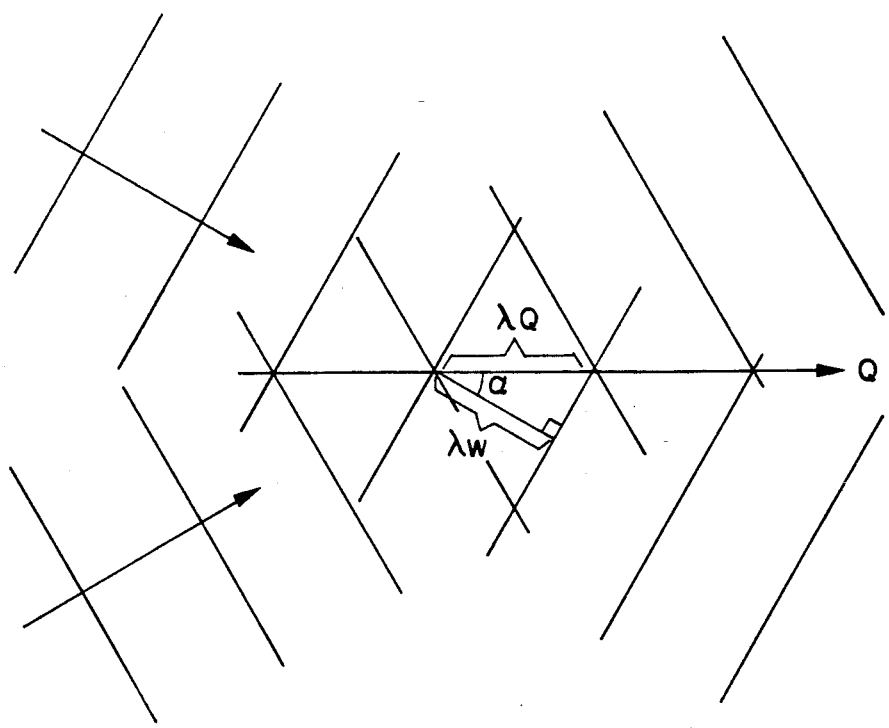
FIG. 11 is a simulative view showing the wave fronts of two beams at their crossing point when the beams become incident upon a medium from two directions without passing through a conical lens.

The present invention was preceded by a detailed analysis of how a beam passing through a conical lens is converged. To begin with, we will describe a case in which fundamental waves become incident upon the conical lens from two directions with reference to FIG. 11, which shows a state in which beams each having a wavelength $\lambda_\omega$ are applied through the optical medium at an angle of $\alpha$ with respect to the direction Q without passing through a conical lens. The lines skewed to the direction Q represent the wave fronts of these beams. As will be clear from FIG. 11, for the wavelength $\lambda_Q$ when, in the above state, the electric field formed at the crossing point of the means is viewed is:

$$\lambda_Q = \lambda_\omega / \cos\alpha \quad (16)$$

That is, phase matching between the high harmonic wave and fundamental wave in the direction Q becomes possible since $\lambda_Q$ can be controlled by changing the angle $\alpha$. However, if fundamental waves are converged for performing a wavelength conversion efficiently, the length of interaction of the two beams would become short.

Figure 12:
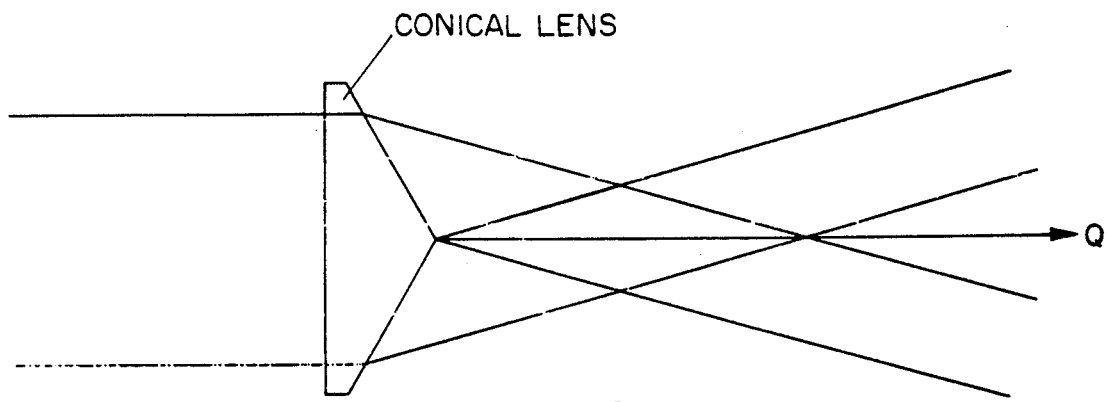
FIG. 12 is a simulative view showing the converging function of the conical lens.

In view of this, the present inventors investigated the effects of beam convergence by a conical lens. FIG. 12 shows an example in which a conical lens is used. Comparing FIG. 12 to FIG. 11 it may appear that both figures are similar to each other. However, the apparent similarity is only because the figures are drawn two-dimensionally; actually they are fundamentally different from each other.

Figure 13:
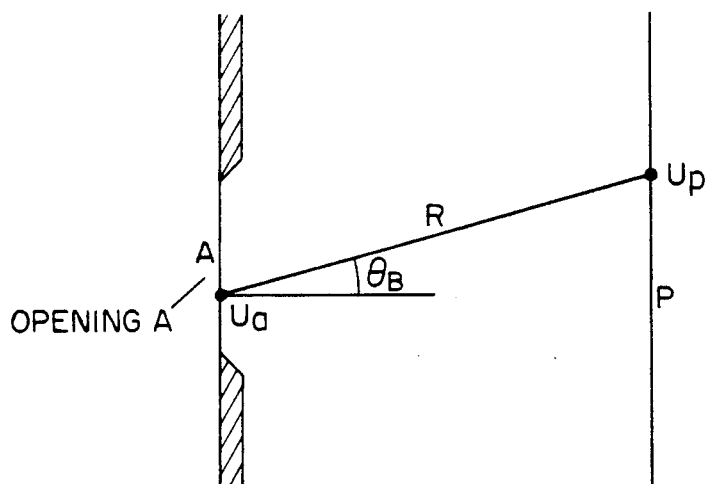
FIG. 13 is a view illustrating a beam propagating through an opening.
Figure 14:
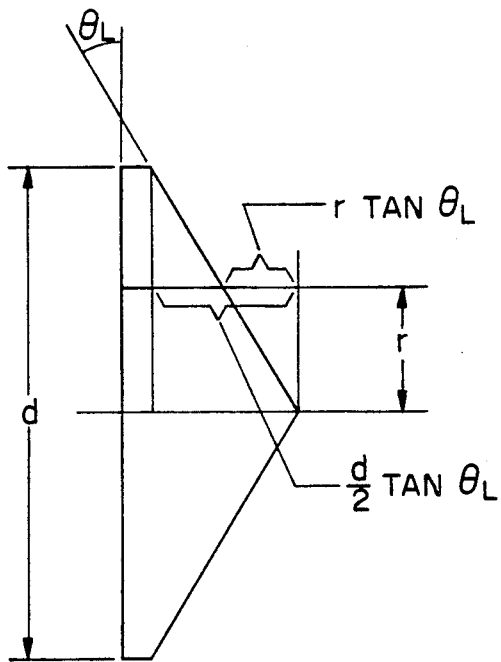
FIG. 14 is an illustration of parameters relating to a conical lens.

In order to observe how a beam propagates after it has passed through an opening A as shown in FIG. 13, the following Krichhoff's equation may be used.

$$u_p = \frac{ik}{4\pi} \int\int A \, u_a \frac{e^{-ikR}}{R} (1 + \cos\theta_B) ds \tag{17}$$

wherein Va is the amplitude distribution of an electrostatic field at the opening A, $u_p$ is the amplitude distribution of the electrostatic field when the beam propagated from the opening A has reached another plane P, R is the length of a vector connecting a point of the opening A and a point in the plane P, $\theta_B$ is the angle the vector makes with a line normal to the opening A, and ds is an area element of the opening A. In order to discuss the converging process by the conical lens, it may be well to consider that a phase leg takes place at a point at which the plane wave has reached the opening. Now, assuming that the phase lag is expressed by $$P_d = i^{-j\psi(r)} \tag{18}$$

the following equation will result as will be clear from FIG. 14.

$$\begin{aligned}\psi(r) &= k\eta_L \left(\frac{d}{2}\tan\theta_L - r\tan\theta_L\right) + kr\tan\theta_L \\ &= k\tan\theta_L \left(\eta_L\left(\frac{d}{2} - r\right) - r\right)\end{aligned} \tag{19}$$

wherein k is the constant for waves in the air, $\theta_L$ is the angle between the conical and bottom surfaces of the lens (the "vertical angle" of the lens), $\eta_L$ is the refractive index of the lens, d is the diameter of the lens and r is the distance from the center of the lens. Assuming that the absolute value of the field strength at the opening A is 1, $$u_a = e^{-j\psi(r)} \tag{20}$$

will follow and so the beam distribution will be able to be obtained by numerical integration with the substitution of the above equation into the equation (17). As $u_p$ is a complex amplitude representing the field strength, the energy density I is obtained by the equation of:

$$I = |u_p|^2 \tag{21}$$

Figure 15:
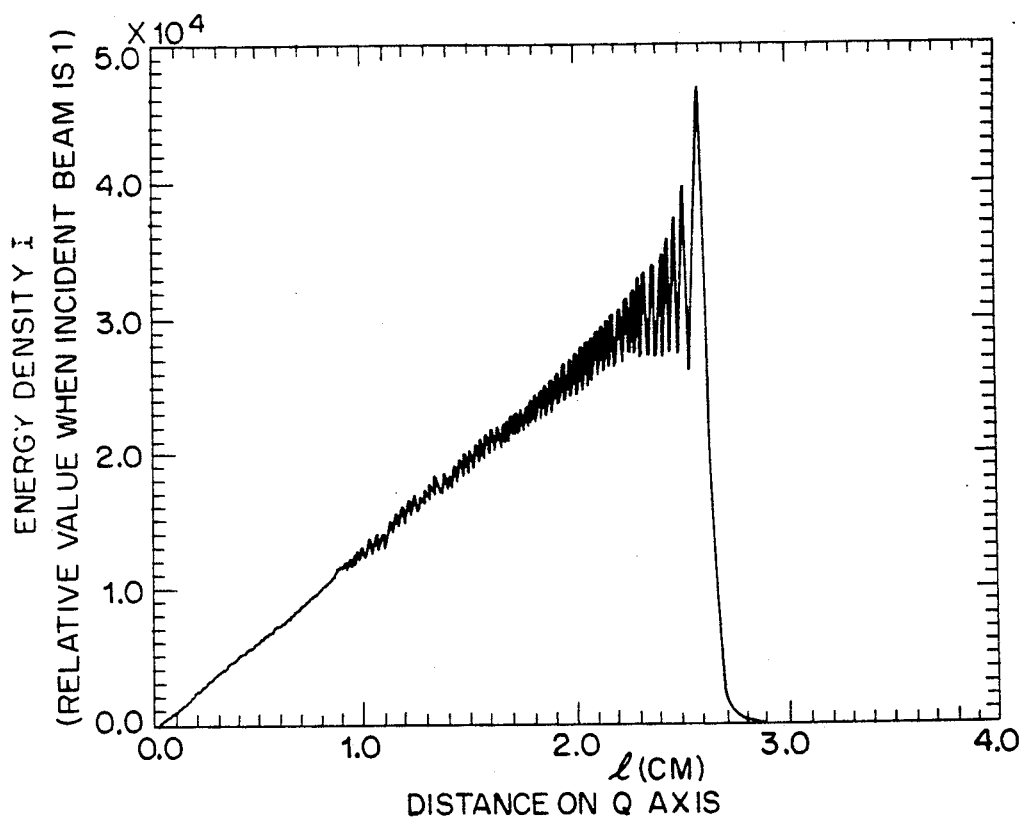
FIG. 15 is a graph showing a relationship between a position on the central axis of a beam converged by a conical lens and the energy density of the beam.

FIG. 15 is a graph showing the energy density value on the center line of the beam after the passage of the beam through the lens, that is, on the Q axis in FIG. 12. In the graph, $\theta_L = 20°$, d=1 cm, $\eta_L = 1.507$ and $k = 5.91 \times 10^4$ cm$^{-1}$ (equivalent to $\lambda = 1.063$ μm). As will be clear from the figure, the value of I increases in proportion to the distance l but it abruptly decreases at a distance of about 2.6 cm, that is, the point at which the overlapped beams begin to separate again. From the above calculation, it will be seen that the energy density on the center line of the beam becomes about $4 \times 10^4$ times the incident beam. The oscillations overlaid on the increase curve are due to diffractions at the end portion of the opening A.

Figure 16:
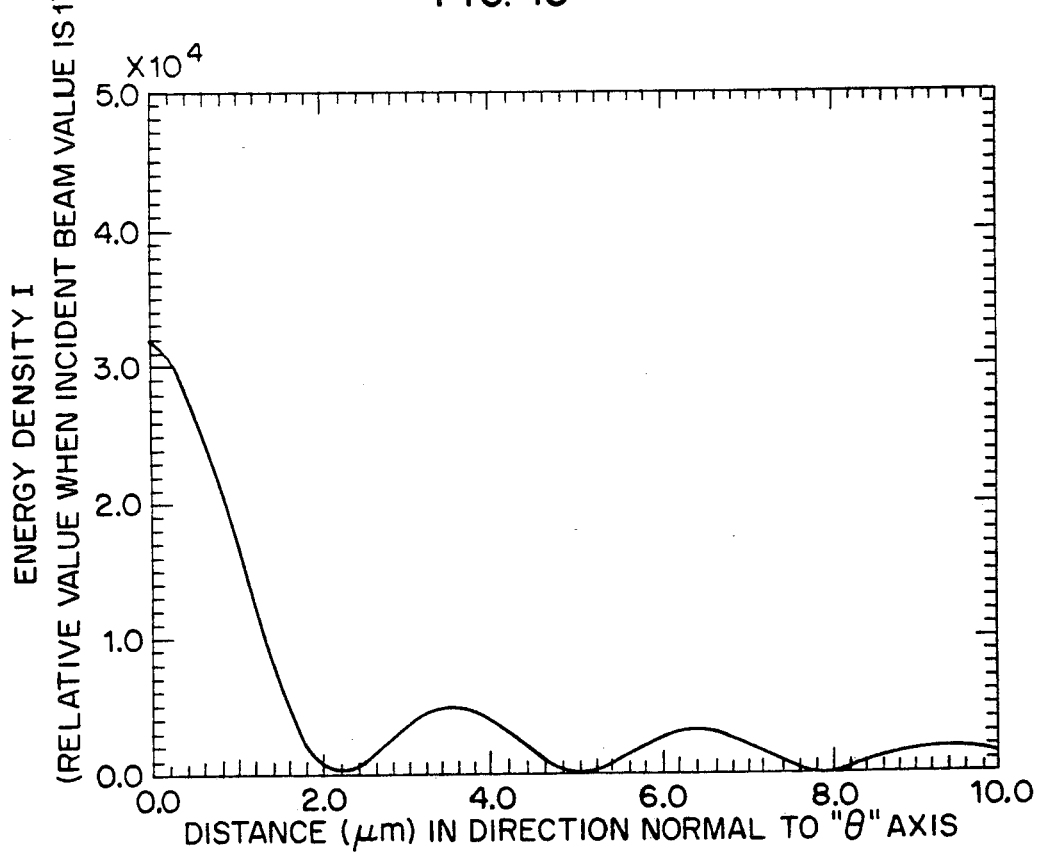
FIG. 16 is a graph showing beam energy density variations in a directional normal to the central axis of a beam.

FIG. 16 is a graph showing the results of obtaining the energy density in the direction normal to the Q axis at the point of l=2.5 cm in FIG. 15. From this graph it will be seen that the energy density has a large peak value in the region of a radius of about 2 μm near the center.

Figure 17:
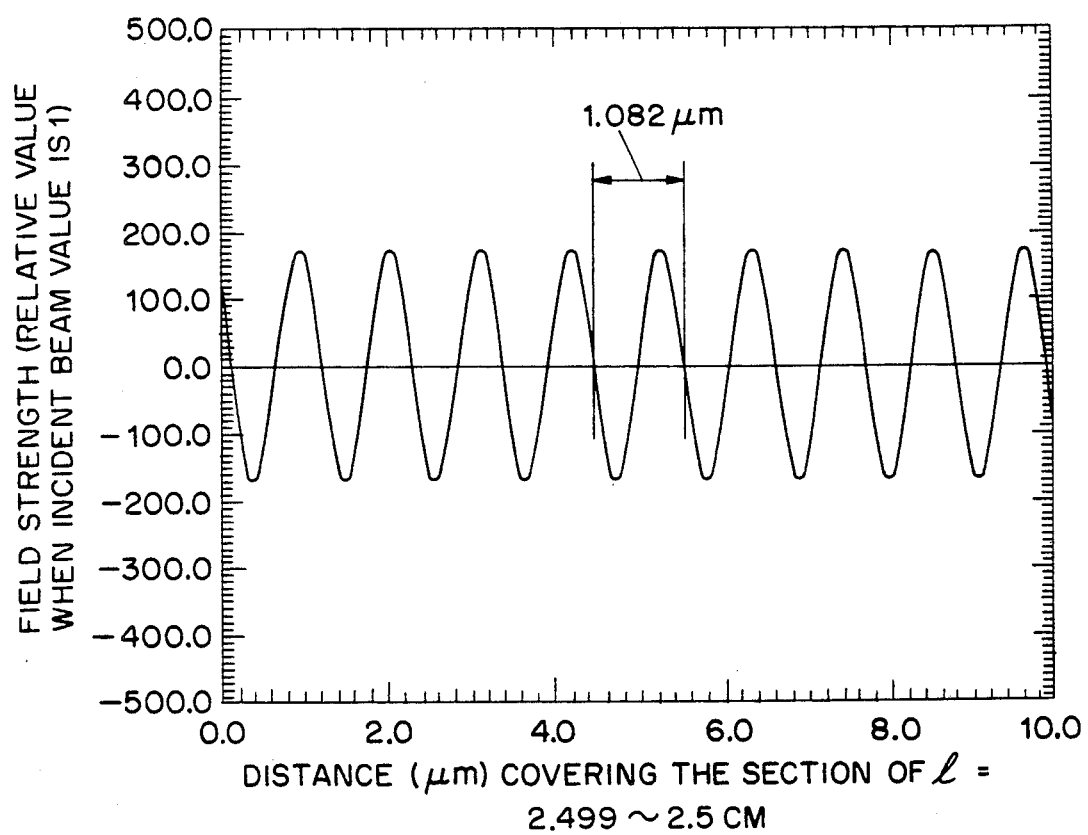
FIG. 17 is a graph showing the field strength on the central axis of a beam.

To know the field strength instead of the energy density, it may be well to obtain the real number portion of $u_p$. In FIG. 17, the electric field of the section (10 μm) of l=2.499−2.5 cm on the Q axis is shown on an enlarged scale and from this figure, it will be seen that the wavelength $\lambda_o = 1.082$ μm. On the other hand, where the above-mentioned lens is used, the angle α the beam after refraction makes with the z axis is 11.026° and hence $\lambda_o = 1.083$ μm from the equation (16) so that it will be seen that the wavelength of the vibrating electric field on the Q axis is substantially equal to the estimated value according to the equation (16).

In summation, when the beam is converged by the conical lens, the optical energy is focused on the center line of the beam with the formation of sharp peaks of energy density and the wavelength of the vibrating electric field can be adjusted by changing the vertical angle of the conical lens.

The present invention makes use of the above-mentioned characteristics of the conical lens. According to the invention, the kind of nonlinear optical crystal and the wavelength $\lambda_o$ for 90° phase matching are first determined on the basis of the wavelengths of the fundamental and high harmonic waves and then the vertical angle of the conical lens is determined. When a laser beam is converged by this type of lens to become incident upon the crystal, the desired phase matching conditions are almost satisfied. Next, a fine adjustment of phase matching is possible by changing the temperature of the crystal. This temperature can be set near the room temperature and it is possible to meet various wavelengths by changing the vertical angle of the lens. Further, as the optical energy concentrates on the central axis of the beam and the ridges formed by the peaks of the optical energy continue long, the length of interaction of polarization and high harmonic waves becomes long thereby enabling a high efficiency wavelength conversion to be performed.

DESCRIPTION OF THE PREFERRED EMBODIMENTS

Preferred embodiments of the wavelength conversion device of the present invention will now be described in detail.

Figure 1:
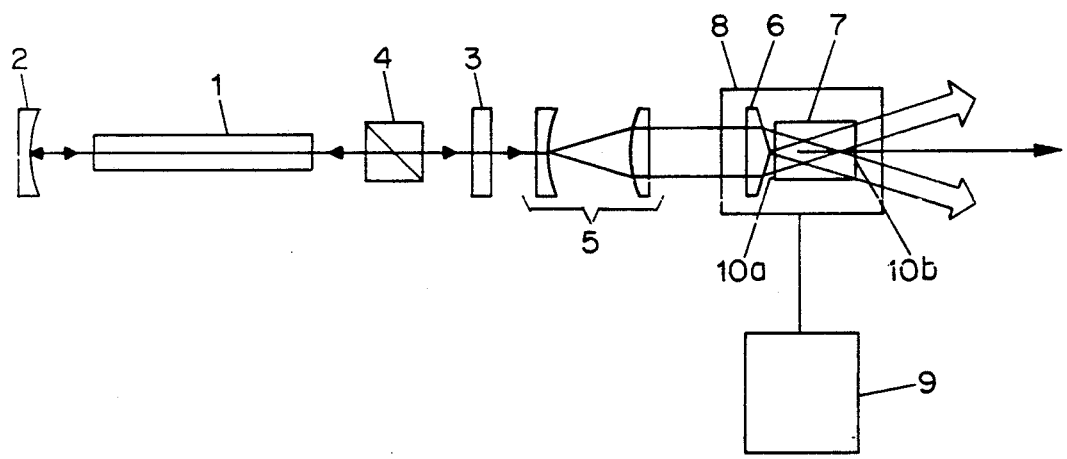
FIG. 1 is a block diagram of a first embodiment of a wavelength conversion device according to the present invention, which utilizes a conical lens.

FIG. 1 shows a structure of a first embodiment of the invention. As shown, a first beam generating and projecting means, for providing an optical frequency electromagnetic beam, comprises a YAG rod 1, a total reflection mirror 2, an output mirror 3 for allowing a part of a laser beam to pass therethrough, a polarizer 4 and a beam expander 5 to be described later. A laser resonator is formed by the elements 1 through 4 and a laser beam of a wavelength of 1.063 μm is output from the output mirror 3. Note that in FIG. 1, a lamp and a power source for exciting the YAG are omitted since they have no direct relation with the present invention. As the polarizer 4 is within the laser resonator, the output beam becomes a linearly polarized one. For performing the Type I wavelength conversion, the direction of polarization becomes normal to the optical axis of the nonlinear optical crystal. After being expanded in diameter or cross-section by the beam expander 5 formed of a lens pair including a concave lens and a convex lens, the laser beam is applied as a collimated beam to a conical lens 6 so as to be converged thereby and becomes incident upon a lithium niobate (LiNbO$_3$)

crystal 7 as a nonlinear optical medium, from an entrance side surface 10a. In this connection, the beam expander 5 is not required when the diameter of the laser beam is originally large. In this case, a fundamental wave is released radially, at an angle off the axis, from an exit side surface 10b of the crystal 7 while a high harmonic wave generates on the central axis of the beam. The conical lens 6 and the LiNbO$_3$ crystal 7 are contained within a temperature adjusting vessel or enclosure 8 and the temperature of the crystal is controlled by a temperature controller 9. Note that FIGS. 1 through 6 show simplified cross-sectional type views, so that, for example, mirror 2 may typically be a concave mirror of circular configuration when viewed along the central axis of the device.

Figure 2:
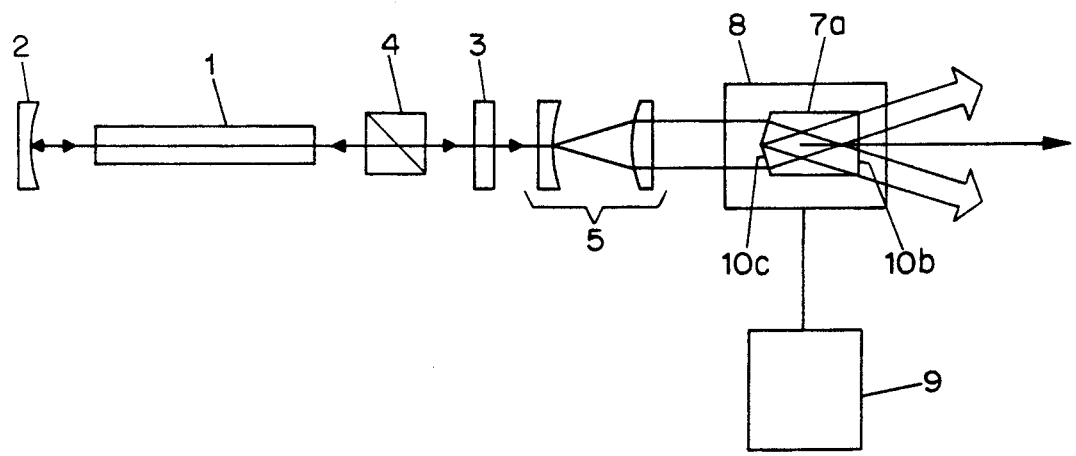
FIG. 2 is a block diagram of a second embodiment which utilizes a shaped crystal.

FIG. 2 shows a structure of a second embodiment of the present invention. Note that in FIGS. 2 through 6, like parts with FIG. 1 are designated by like reference numerals for the sake of omitting repetitive description thereof. The point of difference between the instant embodiment and the first embodiment resides in that in the case of the FIG. 2 embodiment, the entrance side surface 10c of the LiNbO$_3$ crystal 7 is ground to a substantially conical shape instead of using a conical lens, so as to make use of beam refraction on the surface but both of the embodiments are based on the same principle.

Figure 3:
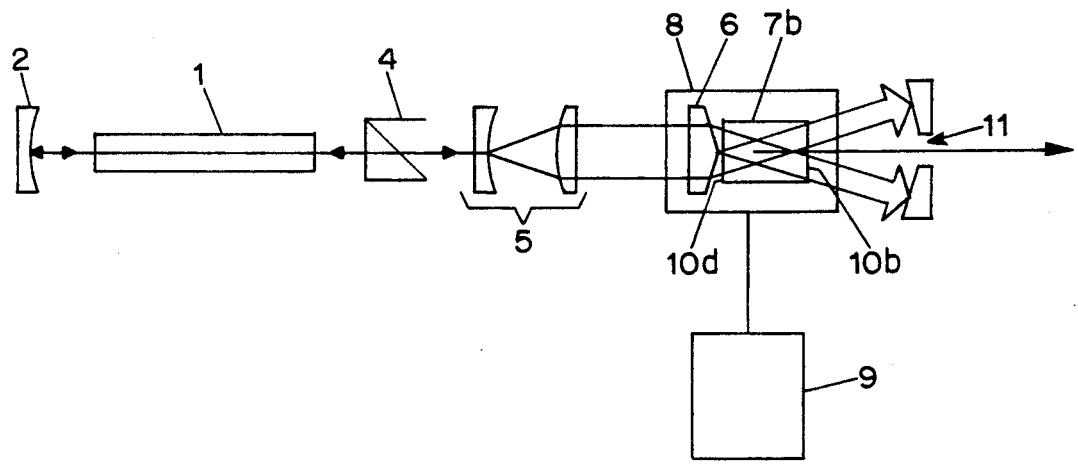
FIG. 3 is a block diagram of a third embodiment which utilizes an output mirror with an exit port.

On the other hand, a third embodiment of the present invention shown in FIG. 3 differs greatly from the above two embodiments in that the former performs wavelength conversion within the laser resonator. In the instant embodiment, the exit side surface 10b of the crystal 7 faces toward an output mirror 3a having a substantially conical reflecting surface whose angle of inclination is adjusted to the angle of refraction of the beam due to the use of the conical lens. Further, the output mirror 3a is provided with an exit port 11 for taking out a high harmonic wave. The reflectance of the reflecting surface with respect to the fundamental beam (wavelength =1.063 μm) is set to 100%. That is, the fundamental wave is confined within the resonator without releasing outside. Further, the entrance side surface 10d of a LiNbO$_3$ crystal 7b is applied with a HR (high reflection) coating against the high harmonic wave (wavelength =0.532 μm) so that every high harmonic wave generated is released from the exit port 11. This structure is quite effective in enhancing the wavelength conversion efficiency because the strength of the fundamental wave is large in the resonator and a secondary nonlinear polarization is proportional to the square of the strength of the fundamental wave.

The above three embodiments are examples of applications of the present invention to second high harmonic generation (SHG), but the embodiment to be described next is an application of the present invention to optical parametric oscillations (OPO). As to a case in which beams of angular frequencies $\omega_1$, $\omega_2$, $\omega_3$ interact due to the secondary nonlinear polarization to satisfy the relationship of $\omega_3=\omega_1+\omega_2$, we have already described that with reference to the equations (7) through (11) and the OPO also makes use of such relationship. In this case, a beam of $\omega_3$ is applied as a fundamental wave to generate beams of $\omega_1$ and $\omega_2$. The values for $\omega_1$ and $\omega_2$ are determined by the following phase matching condition:

$$\Delta k = k_3 - k_1 - k_2 = 0 \tag{22}$$

The difference between the OPO and SHG in performing phase matching resides in the fact that in the case of the former, the wavelength of the fundamental wave is smaller than that of the beam generated from the fundamental wave. Accordingly, in the normal condition, the wavelength of the nonlinear polarization wave is smaller than that of the generating beam. As will be clear from the examples of SHG, it is possible with the present invention to adjust the wavelength of the nonlinear polarization wave to increase. That is, when the present invention is applied to the OPO, it is possible to obtain a phase matching without making use of double refraction.

Figure 4:
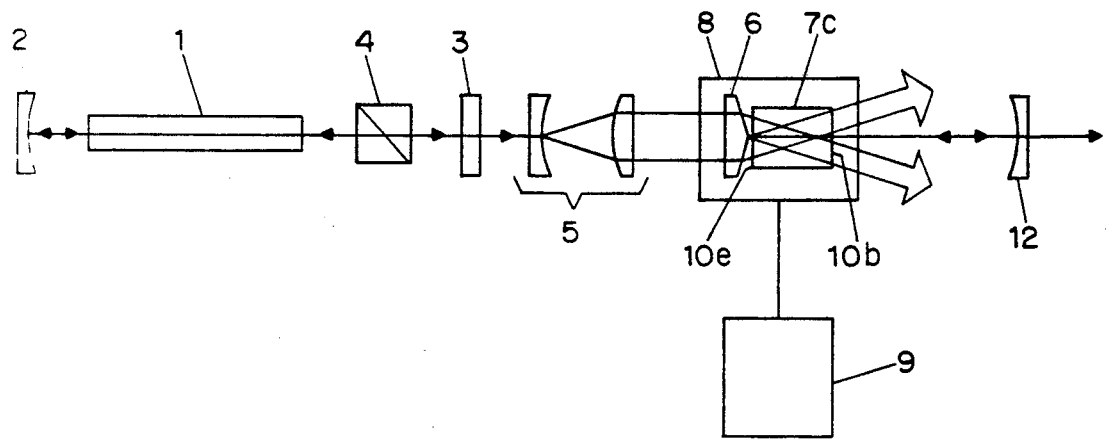
FIG. 4 is a block diagram of a fourth embodiment which utilizes an external resonator.

In the case of the OPO, the crystal is put into the resonator and the beam generated from the crystal is amplified in the resonator. Accordingly, the embodiment shown in FIG. 4 includes similar components. In FIG. 4, an entrance side surface 10e of the crystal is applied with an AR (antireflective) coating against the fundamental wave and with a HR coating. Further, an external resonator output mirror 12 allows a part of the generated beam to pass therethrough. That is, the generated beam resonates and a part thereof is taken out from the mirror 12.

All of the above embodiments make use of a conical refractive surface but the same effect can be obtained by using a conical concave reflecting surface.

Figure 5:
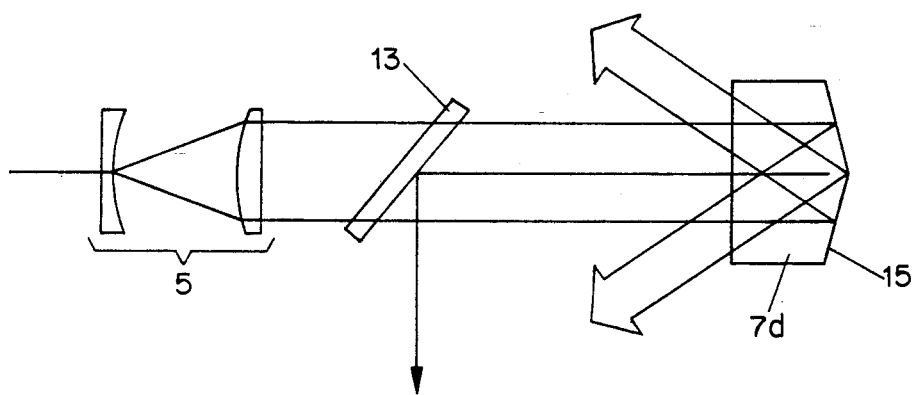
FIG. 5 is a block diagram of a fifth embodiment which utilizes a crystal shaped on the exit end.
Figure 6:
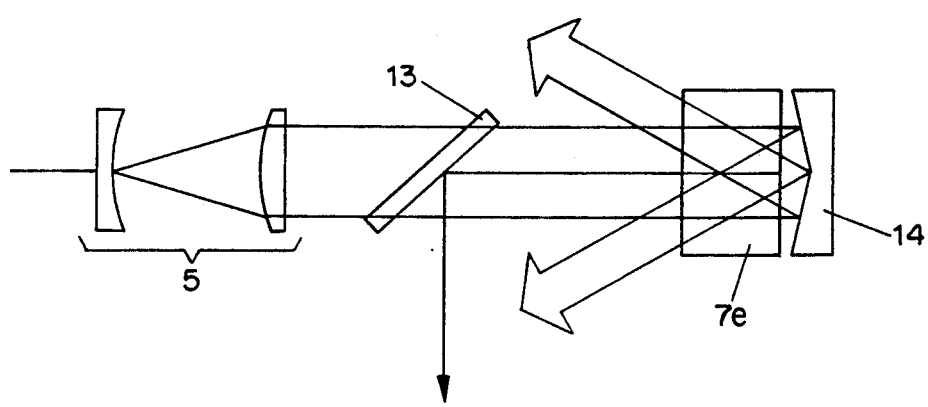
FIG. 6 is a block diagram of a sixth embodiment which utilizes a conical mirror.
Figure 7:
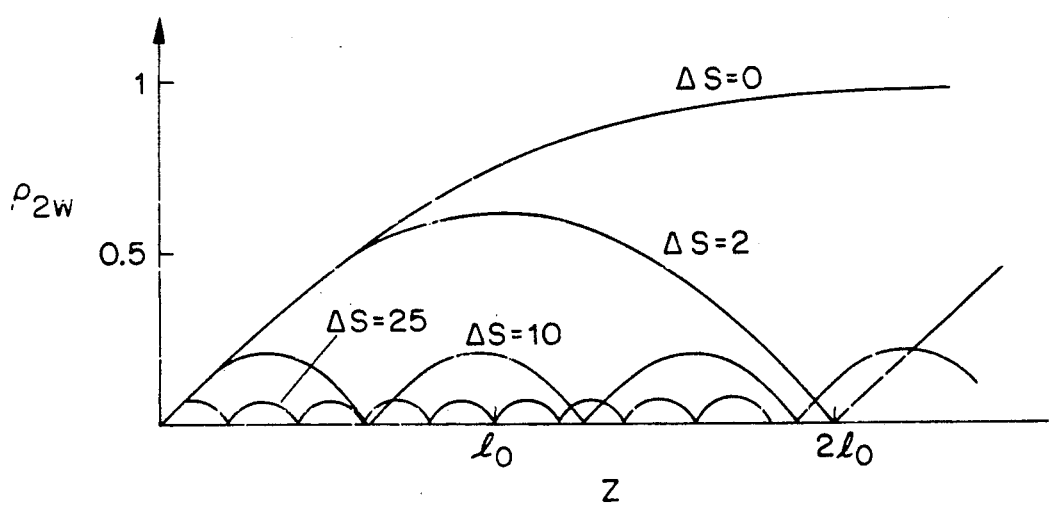
FIG. 7 is a graph showing an increase of a second high harmonic wave by SHG (Second High Harmonic Generation)
Figure 8:
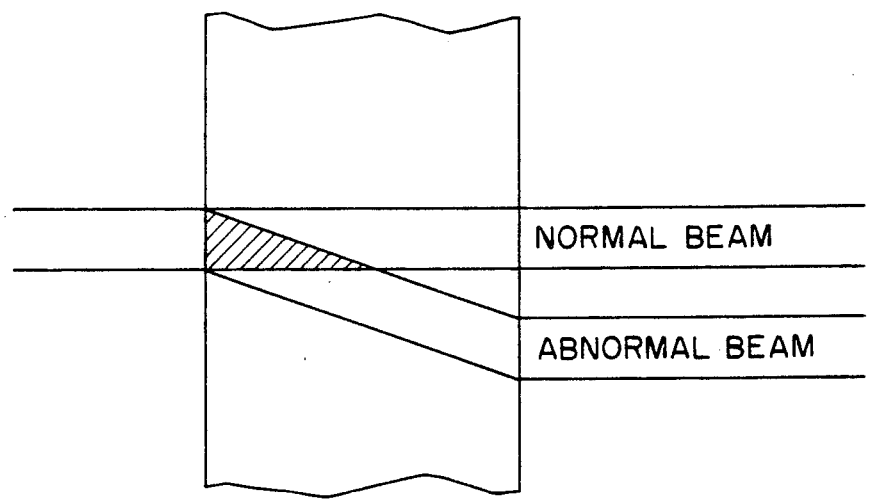
FIG. 8 is a simulative view showing separation of a normal beam from an abnormal beam due to refraction.
Figure 10:
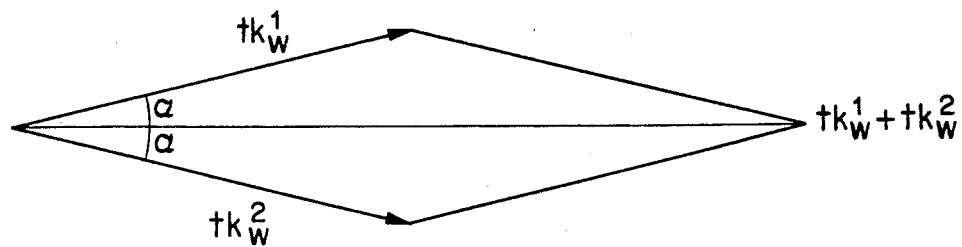
FIG. 10 is an illustrative view showing a relationship between a wave number vector of a fundamental beam becoming incident in a different direction and a wave number vector of a generating nonlinear polarization wave.
Figure 9:
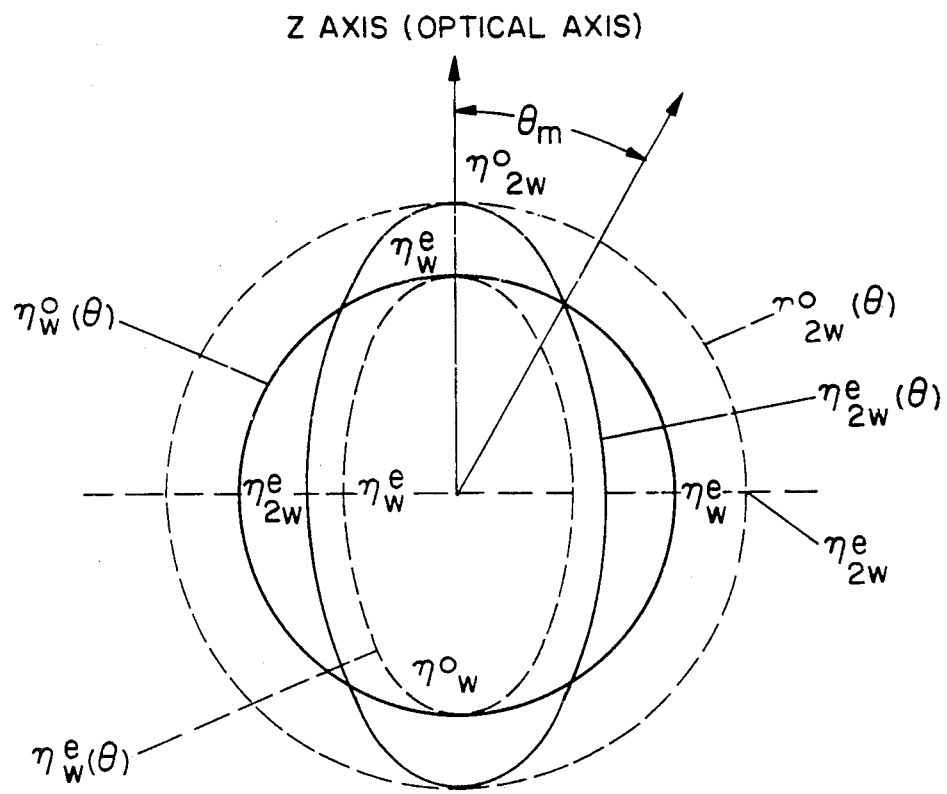
FIG. 9 is an illustrative view showing a principle of phase matching in the presence of refraction.

A fifth embodiment of the present invention is shown in FIG. 5. In FIG. 5, and FIG. 6 to be described later, only the portion of the device located away from the beam expander 5 in the laser beam progressing direction is shown and the vessel 8 and the temperature controller 9 are omitted. In FIG. 5, a LiNbO$_3$ crystal 7d has its one side surface ground substantially conical as in the case of the second embodiment so as to form a reflecting side surface 15. This surface 15 is applied with a HR coating against the fundamental wave. In the above arrangement, when a laser beam as a fundamental beam is applied to the plane entrance side surface of the crystal 7d, the fundamental beam reflects on the conical reflecting side surface 15, a high harmonic wave generates on the center axis of the converged beam, as in the cases of the previous embodiments, and becomes incident upon a plane parallel-sided plate 13. In the instant embodiment, both surfaces of the plane parallel plate 13 are applied with an AR coating against the fundamental beam and with a HR coating against the high harmonic wave, respectively, so that the high harmonic wave is outputted in a direction normal to the fundamental wave, as shown by the vertical arrow.

FIG. 6 shows a sixth embodiment of the present invention. This embodiment uses a conical mirror 14, instead of grinding a LiNbO$_3$ crystal 7e conical, and is based on the same principle as the fifth embodiment. However, as will be clear from the figure, it can not converge every fundamental wave within the crystal 7e because a clearance spacing inevitably exists between the mirror 14 and the crystal 7e so that it is somewhat less effective as compared with the FIG. 5 embodiment, however, the machining of the crystal is simpler since it need not be ground to conical shape.

As described in detail, when the present invention is applied to the second high harmonic generation, a 90° phase matching is obtained with the use of various nonlinear optical crystals and a high efficiency wavelength conversion is made possible.

Further, where the invention is applied to the optical parametric oscillations (OPO), phase matching is made possible without using double refraction. Where double refraction is used, if it is desired to make the fundamental wave a normal beam and the generated wave an abnormal beam, it will be necessary to generate polarization in a direction normal to the polarizing direction of the fundamental beam. As will be seen from the equation (2), this means that the $d_{11}$ component of the secondary nonlinear polarizability matrix can not be used. However, the $d_{11}$ component is known to be larger than the remaining components. For example, MNA (2-methyl-4-nitroaniline) which has attracted a good deal of public attention of late as having a large nonlinear optical constant has the value of $d_{11}$ of 8.6 times that of $d_{12}$. Accordingly, since the OPO is made possible by the present invention without using double refraction, it is possible to achieve a high efficiency wavelength conversion using the $d_{11}$ component. Further, crystals such as tellurium Te and gallium arsenic GaAs which have not been used so far because of no double refraction despite their having a large nonlinear optical constant can also be made use of with the present invention.

I claim:

1. In a wavelength conversion device provided with beam generating and projecting means and a nonlinear optical medium, and in which a beam generated by the beam generating and projecting means is applied on the optical medium so as to obtain an outgoing beam of a different wavelength, the improvement characterized in that wave front conversion means is provided for converging a beam from said beam generating and projecting means within said nonlinear optical medium such that a wave front of the converging beam is substantially conical and converged into said nonlinear optical medium, and said beam generating and projecting means is so constructed that said beam is applied on said wave front conversion means in a collimated form.

2. A wavelength conversion device according to claim 1, wherein said wave front conversion means comprises a substantially conical lens positioned between said beam generating and projecting means and said nonlinear optical medium and has the top of its conical portion directed opposite to said beam generating and projecting means.

3. A wavelength conversion device according to claim 1, wherein said wavefront conversion means comprises the surface of said nonlinear optical medium facing said beam generating and projecting means in substantially the shape of a cone and has the top of its conical portion directed toward said beam generating and projecting means.

4. A wavelength conversion device according to claim 1, wherein said wavefront conversion means comprises the surface of said nonlinear optical medium lying opposite to said beam generating and projecting means in substantially the shape of a cone and has the top of its conical portion directed opposite to said light generating and projecting means so that the wave front of the beam from said beam generating and projecting means is reflected to become conical and converged into said nonlinear optical medium, and the device additionally comprises a plane parallel plate provided between said beam generating and projecting means and said nonlinear optical medium so that a high harmonic wave component of said beam reflects on said plate in a direction normal to said beam.

5. A wavelength conversion device according to claim 1, wherein said wavefront conversion means comprises a substantially conical mirror having the top of its conical concave portion directed opposite to said beam generating and projecting means, said mirror positioned opposite to said beam generating and projecting means with respect to said nonlinear optical medium so that the wave front of the beam from said beam generating and projecting means is reflected to become conical and converged into said nonlinear optical medium, and the device additionally comprises a plane parallel plate provided between said beam generating and projecting means and said nonlinear optical medium so that a high harmonic wave component of said reflected beam reflects in a direction normal to said beam.

6. A wavelength conversion device, comprising:
first means for providing a first optical frequency electromagnetic beam of a first wavelength;
crystal means, having a non-linear optical characteristic, for providing an output beam of a different wavelength in response to said optical frequency electromagnetic beam of said first wavelength which is caused to converge within said crystal means; and
wave front conversion means, coupled to said first beam and having a substantially conical surface, for converging said first beam with a substantially conical wave front into said crystal means to cause said first beam to converge within said crystal means over a predetermined distance along the center axis of said first beam within said crystal means, for producing an output beam of a different wavelength.

7. A wavelength conversion device as in claim 6, additionally comprising polarizer means for causing the beam provided by said first means to be linearly polarized.

8. A wavelength conversion device as in claim 6, additionally comprising beam expander means for expanding the beam provided by said first means, thereby providing a collimated beam of expanded cross-section.

9. A wavelength conversion device as in claim 6, additionally comprising a temperature controlled vessel enclosing said crystal means.

10. A wavelength conversion device as in claim 6, in which said first means is a laser.

11. A wavelength conversion device as in claim 6, 7, 8 or 9, in which said wavefront conversion means comprises a lens having a substantially conical contour positioned between said first means and said crystal means.

12. A wavelength conversion device as in claim 6, 7, 8 or 9, in which said wavefront conversion means comprises an input surface of said crystal means having a substantially conical contour.

13. A wavelength conversion device as in claim 6, 7, 8 or 9, in which said wavefront conversion means comprises a lens having a substantially conical contour positioned between said first means and said crystal means, and said device additionally comprises an output mirror with a central output opening positioned on the side of said crystal means opposite to said first means.

14. A wavelength conversion device as in claim 6, 7, 8 or 9, in which said wavefront conversion means comprises a lens having a substantially conical contour positioned between said first means and said crystal means, and said device additionally comprises a partially transmissive external resonator output mirror positioned on the side of said crystal means opposite to said first means.

15. A wavelength conversion device as in claim 6, 7, 8 or 9, in which said wavefront conversion means comprises the surface of said crystal means opposite to said first means and said surface has a substantially conical mirrored contour, said device additionally comprising means for providing a reflective surface for directing said output beam away from the center axis of the said first beam.

16. A wavelength conversion device as in claim 6, 7, 8 or 9, in which said wavefront conversion means comprises a mirror having a substantially conical contour positioned on the side of said crystal means opposite to said first means, and said device additionally comprises means for providing a reflective surface for directing said output beams away from the center axis of the said first beam.

17. A method for converting the wavelength of an optical frequency electromagnetic beam, comprising the steps of:
  (a) providing a first beam of optical frequency electromagnetic energy of a first wavelength;
  (b) converging said first beam by interaction with a substantially conical surface to provide a converging beam having a substantially conical wave front;
  (c) producing an output beam of a wavelength different from said first wavelength by coupling said converging beam to a non-linear optical medium and causing said converging beam to converge within said non-linear optical medium along the center axis of said first beam within said optical medium; and
  (d) coupling out of said optical medium said output beam of optical energy that has undergone wavelength conversion.

18. A method for converting the wavelength of an optical frequency electromagnetic beam as in claim 17, additionally comprising the step of adjusting the angular characteristic of said conical surface to adjust the wavelength of the output beam.

19. A method for converting the wavelength of an optical frequency electromagnetic beam as in claim 17, additionally comprising the step of maintaining the temperature of said optical medium and thereby controlling the wavelength of the output beam.

20. A method for converting the wavelength of an optical frequency electromagnetic beam as in claim 17, additionally comprising the step of optically expanding the cross-sectional size of said beam prior to converging said beam.

21. A method for converting the wavelength of an optical frequency electromagnetic beam as in claim 17, 19 or 20, wherein step (b) comprises applying said beam to a lens having a substantially conical contour.

22. A method for converting the wavelength of an optical frequency electromagnetic beam as in claim 17, 19 or 20, wherein step (b) comprises applying said beam to an input surface of said optical medium having a substantially conical contour.

23. A method for converting the wavelength of an optical frequency electromagnetic beam as in claim 17, 19 or 20, wherein step (b) comprises applying said beam to a mirror having a substantially conical contour which is positioned beyond the output side of said optical medium.

24. A method for converting the wavelength of an optical frequency electromagnetic beam as in claim 17, 19 or 20, wherein step (b) comprises applying said beam to a mirrored surface of said optical medium having a substantially conical contour.

25. A wavelength conversion device according to claim 1, wherein at least approximate phase matching in the outgoing beam is realized at least at two energy maxima of the beam converged from said beam generating and projecting means.

* * * * *

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

Page 1 of 7

It is certified that error appears in the above-identified patent and that said Letters Patent is hereby corrected as shown below:

Title page, item [56] References Cited, "Other Publications", "Scond" should read --Second--.

Col. 1, line 24, "P" should read $--\vec{P}--$ and "E" should read $--\vec{E}--$;

Col. 1, line 27, "P = $P_L$ + $P_{NL}$" should read $--\vec{P} = \vec{P}_L + \vec{P}_{NL}--$;

Col. 1, line 29, "$P_L = \chi^{(1)} \cdot E$" should read $--\vec{P}_L = \chi^{(1)} \cdot \vec{E}--$;

Col. 1, line 31, "$P_{NL} = \chi^{(2)} : E \cdot E + E \cdot E \cdot E \cdot + \cdots$" should read $--\vec{P}_{NL} = \chi^{(2)} : \vec{E} \cdot \vec{E} + \chi^{(3)} : \vec{E} \cdot \vec{E} \cdot \vec{E} + \cdots --$;

Col. 1, line 33, "$P_L$" should read $--\vec{P}_L--$ and "$P_{NL}$" should read $--\vec{P}_{NL}--$;

Col. 1, line 39, "E" should read $--\vec{E}--$;

Col. 1, line 42, "$P_{NL}$" should read $--\vec{P}_{NL}--$;

Col. 1, line 45, "$P_{NL}$" should read $--\vec{P}_{NL}--$;

Col. 1, line 46, "E" (first occurrence) should read $--\vec{E}--$;

Col. 1, line 52, "$P_{NL}$" should read $--\vec{P}_{NL}--$;

Col. 2, lines 1 and 2, "$E_1$ and $E_2$" should read $--\vec{E}_1$ and $\vec{E}_2--$;

Col. 2 line 5, "E = $E_1$ + $E_2$" should read $--\vec{E} = \vec{E}_1 + \vec{E}_2--$;

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

It is certified that error appears in the above-identified patent and that said Letters Patent is hereby corrected as shown below:

Col. 2, line 6, "$E_1 = E_{10}\cos(\omega_1 t - k_1 \cdot r + 0_1)$" should read --$\vec{E}_1 = \vec{E}_{10} \cos(\omega_1 t - \vec{k}_1 \cdot \vec{r} + \phi_1)$--;

Col. 2, line 7, "$E_2 = E_{20}\cos(\omega_2 t - k_2 \cdot r + 0_2)$" should read --$\vec{E}_2 = \vec{E}_{20} \cos(\omega_2 t - \vec{k}_2 \cdot \vec{r} + \phi_2)$--;

Col. 2, lines 11-15

$$" E \cdot E = (E_1 + E_2) \cdot (E_1 + E_2)$$
$$= E_{10}^2 \cos(\omega_2 t - k_2 \cdot r + \phi_1) + E_{20}^2 \cos(\omega_2 t - k_2 \cdot r + \phi_2) + 2E_{10} \cdot E_{20}^2 \cos(\omega_1 t - k_1 \cdot r + \phi_1)\cos(\omega_2 t - k_2 \cdot r + \phi_2)" \quad (4)$$

should read $$--\vec{E} \cdot \vec{E} = (\vec{E}_1 + \vec{E}_2) \cdot (\vec{E}_1 + \vec{E}_2)$$
$$= \vec{E}_{10}^2 \cos(\omega_1 t - \vec{k}_1 \cdot \vec{r} + \phi_1) \quad (4)$$
$$+ \vec{E}_{20}^2 \cos(\omega_2 t - \vec{k}_2 \cdot \vec{r} + \phi_2)$$
$$+ 2\vec{E}_{10} \cdot \vec{E}_{20}^2 \cos(\omega_1 t - \vec{k}_1 \cdot \vec{r} + \phi_1)\cos(\omega_2 t - \vec{k}_2 \cdot \vec{r} + \phi_2) --;$$

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

It is certified that error appears in the above-identified patent and that said Letters Patent is hereby corrected as shown below:

Col. 2, line 17, "r" should read --$\vec{r}$-- and "$k_1$, $k_2$" should read --$\vec{k}_1$, $\vec{k}_2$--;

Col. 2, line 18, "$0_1$, $0_2$" should read --$\phi_1$, $\phi_2$--;

Col. 2, lines 21-22,

"$\cos^2(\omega_i t - k_i \cdot r + 0_i) = \frac{1}{2}\{1 + \cos(2\omega_i t - 2k_i \cdot r + 20_i)\}(i=1,2)$"  (5)

should read

--$\cos^2(\omega_i t - \vec{k}_i \cdot \vec{r} + \phi_i)$
$= \frac{1}{2}\{1 + \cos(2\omega_i t - 2\vec{k}_i \cdot \vec{r} + 2\phi_i)\}\ (i = 1,2)$--;  (5)

Col. 2, lines 24-27,

"$\cos(\omega_1 t - k_1 \cdot r + \phi_1)\cos(\omega_2 t - k_2 \cdot r + \phi_2) =$
$\frac{1}{2}(\cos\{(\omega_1 - \omega_2)t - (k_1 - k_2) \cdot r + \phi_1 - \phi_2\} +$
$\cos\{(\omega_1 + \omega_2)t - (k_1 + k_2)r + \phi_1 + \phi_2\})$"  (6)

should read

--$\cos(\omega_1 t - \vec{k}_1 \cdot \vec{r} + \phi_1)\cos(\omega_2 t - \vec{k}_2 \cdot \vec{r} + \phi_2)$
$= \frac{1}{2}(\cos\{(\omega_1 - \omega_2)t - (\vec{k}_1 - \vec{k}_2) \cdot \vec{r} + \phi_1 - \phi_2\}$
$+ \cos\{(\omega_1 + \omega_2)t - (\vec{k}_i + \vec{k}_2)\vec{r} + \phi_1 + \phi_2\})$--;  (6)

Col. 2, line 30, "$P_{NL}$" should read --$\vec{P}_{NL}$--;

Col. 2, line 52, "$E_3$" should read --$\vec{E}_3$--;

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

It is certified that error appears in the above-identified patent and that said Letters Patent is hereby corrected as shown below:

Col. 2, line 54, "$E=E_1+E_2+E_3$" should read $--\vec{E} = \vec{E}_1 + \vec{E}_2 + \vec{E}_3--;$ Col. 2, line 60, "$P_{NL} = \chi^{(2)}:E\cdot E = P^{(2\omega 1)} + P^{(2\omega 2)} + P^{(2\omega 3)} + P^{(\omega 1-\omega 2)} + P^{(\omega 3-\omega 2)} + P^{(\omega 3-\omega 1)} + P^{(\omega 1+\omega 2)} + P^{(\omega 3+\omega 2)} + P^{(\omega 3+\omega 1)}$" (8)

should read $$--\vec{P}_{NL} = \chi^{(2)} : \vec{E} \cdot \vec{E} = \vec{P}^{(2\omega_1)} + \vec{P}^{(2\omega_2)} + \vec{P}^{(2\omega_3)}$$
$$+ \vec{P}^{(\omega_1-\omega_2)} + \vec{P}^{(\omega_3-\omega_2)} + \vec{P}^{(\omega_3-\omega_1)}$$
$$+ \vec{P}^{(\omega_1+\omega_2)} + \vec{P}^{(\omega_3+\omega_2)} + \vec{P}^{(\omega_3+\omega_1)} --;$$ (8)

Col. 2, line 66,

"$P^{(\omega 3-\omega 2)}=P^{(\omega 1)}=P^{(\omega 1)}, P^{(\omega 3-\omega 1)}=P^{(\omega 2)}, P^{(\omega 1+\omega 2)}=P^{(\omega 3)}$"

should read $--\vec{P}^{(\omega_3-\omega_2)} = \vec{P}^{(\omega_1)}, \vec{P}^{(\omega_3-\omega_1)} = \vec{P}^{(\omega_2)}, \vec{P}^{(\omega_1+\omega_2)} = \vec{P}^{(\omega_3)}--;$ Col. 3, lines 1-4, "will follow so that the term $E_1$ is derived from the terms $E_3$ and $E_2$, the term $E_2$ from the terms $E_3$ and $E_1$ and the term $E_3$ from the terms $E_1$ and $E_2$. That is, the three modes of $\omega_1, \omega_2, \omega_3$ are combined."

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

It is certified that error appears in the above-identified patent and that said Letters Patent is hereby corrected as shown below:

should read --will follow so that the term $\vec{E}_1$ is derived from the terms $\vec{E}_3$ and $\vec{E}_2$, the term $\vec{E}_2$ from the terms $\vec{E}_3$ and $\vec{E}_1$ and the term $\vec{E}_3$ from the terms $\vec{E}_1$ and $\vec{E}_2$. That is, the three modes of $\omega_1, \omega_2, \omega_3$ are combined.--;

Col. 3, line 5, "the" (first occurrence) should read --The-- and "$P_{NL}$" should read --$\vec{P}_{NL}$--;

Col. 3, line 6, "E" should read --$\vec{E}$--;

Col. 3, line 10, $$" \Delta E - \frac{1}{(c/\eta)^2} \frac{\partial^2 E}{\partial t^2} = \mu \frac{\partial^2 P_{NL}}{\partial t^2} " \qquad (9)$$

should read $$-- \Delta \vec{E} - \frac{1}{(c/\eta)^2} \frac{\partial^2 \vec{E}}{\partial t^2} = \mu \frac{\partial^2 \vec{P}_{NL}}{\partial t^2} -- \qquad (9)$$

Col. 3, line 24,

"$E_i = e_i \rho_i \cos(\omega_i t - k_i z + 0_i) (i=1,2,3)$" (10)

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

It is certified that error appears in the above-identified patent and that said Letters Patent is hereby corrected as shown below:

should read $$\vec{E_i} = \vec{e_i}\, \rho_i\, \cos(\omega_i t - k_i z + \phi_i)\ (i = 1,2,3) \quad (10)$$

Col. 3, line 26, "$e_i$" should read --$\vec{e_i}$--;

Col. 3, line 54, "$0_3+0_2+0_1$" should read --$\phi_3 + \phi_2 + \phi_1$--;

Col. 4, line 5, $$\text{"}\frac{2\omega^2 K}{k_{107}}\text{"}$$

should read $$-- \frac{2\omega^2 K}{k_\omega} --;$$

Col. 4, line 11, "$\rho 2\omega$" should read --$\rho_{2\omega}$--; (both occurrences).

Col. 5, line 47, "$\theta°\omega$" should read --$\eta_\omega^\circ$--;

Col. 6, line 8, "$K_{107}{}^1$ and $k_\omega{}^2$" should read --$\vec{k}_\omega^1$ and $\vec{k}_\omega^2$--;

Col. 6, line 10, "$k_\omega{}^1 + k_\omega{}^2$" should read --$\vec{k}_\omega^1 + \vec{k}_\omega^2$--;

Col. 6, line 13, "$k_{2\omega}$" should read --$\vec{k}_{2\omega}$--;

Col. 6, line 15, "$|k\omega^1|=|k_\omega{}^2|$:" should read --$|\vec{k}_\omega^1| = |\vec{k}_\omega^2|$:--;

UNITED STATES PATENT AND TRADEMARK OFFICE
CERTIFICATE OF CORRECTION

PATENT NO. : 5,173,799

DATED : December 22, 1992

INVENTOR(S) : Ryohei Tanuma

It is certified that error appears in the above-identified patent and that said Letters Patent is hereby corrected as shown below:

Col. 6, line 20, "adjusting o" should read --adjusting $\alpha$--;

Col. 8, line 34, "directional" s.r. --direction--;

Col. 9, line 3, "Krichhoff's" should read --Kirchhoff's--;

Col. 9, line 8, "Va" should read --$u_a$--;

Col. 9, line 21, "$P_d=i$" should read --$P_d = e$--; and

Col. 11, last line, "$\Delta k=k_3-k_1-k_2=0$" should read

--$\vec{\Delta k} = \vec{k}_3 - \vec{k}_1 - \vec{k}_2 = 0$--.

Signed and Sealed this

First Day of February, 1994

BRUCE LEHMAN

*Attest:*

*Attesting Officer*  *Commissioner of Patents and Trademarks*